United States Patent
Adams et al.

(10) Patent No.: US 9,688,551 B2
(45) Date of Patent: Jun. 27, 2017

(54) NOZZLE MIXING APPARATUS AND METHODS FOR TREATING WATER IN SHIP BALLAST TANKS

(71) Applicant: THE UNITED STATES OF AMERICA AS REPRESENTED BY THE SECRETARY OF THE DEPT. OF THE INTERIOR, Washington, DC (US)

(72) Inventors: Noah S. Adams, Carson, WA (US); Barnaby J. Watten, Winchester, VA (US)

(73) Assignee: The United States of America as Represented by the Secretary of the Interior, Washington, DC (US)

( * ) Notice: Subject to any disclaimer, the term of this patent is extended or adjusted under 35 U.S.C. 154(b) by 330 days.

(21) Appl. No.: 14/402,131

(22) PCT Filed: Jun. 13, 2013

(86) PCT No.: PCT/US2013/045560
§ 371 (c)(1),
(2) Date: Nov. 19, 2014

(87) PCT Pub. No.: WO2013/192000
PCT Pub. Date: Dec. 27, 2013

(65) Prior Publication Data
US 2015/0336822 A1    Nov. 26, 2015

Related U.S. Application Data

(60) Provisional application No. 61/661,158, filed on Jun. 18, 2012.

(51) Int. Cl.
*B01F 5/02*        (2006.01)
*B63J 4/00*        (2006.01)
(Continued)

(52) U.S. Cl.
CPC .............. *C02F 1/50* (2013.01); *B01F 5/0206* (2013.01); *B01F 15/00136* (2013.01);
(Continued)

(58) Field of Classification Search
CPC ....... C02F 1/50; C02F 2103/008; B63J 4/002; B01F 5/02; B01F 5/0206; B01F 15/00136; B01F 15/00253
See application file for complete search history.

(56) References Cited

U.S. PATENT DOCUMENTS 3,631,832 A * 1/1972 Rodriguez ................. B63J 2/14
                                                                114/74 R
3,745,960 A   7/1973 Devine
(Continued)

FOREIGN PATENT DOCUMENTS

WO    9943541       9/1999
WO    2011108032    9/2011
(Continued)

OTHER PUBLICATIONS

Adams, N. (Mar. 8, 2011). Great Lakes Ballast Treatment Research. Paper presented at Pacific Ballast Water Group Meeting, Portland Oregon.
(Continued)

*Primary Examiner* — Charles Cooley
(74) *Attorney, Agent, or Firm* — James M Mitchell

(57) ABSTRACT

A system, method, and apparatus for treating ship or barge ballast water. The system includes a ballast tank storing ballast water and one or more nozzles located in the ballast tank. One or more pumps supply a chemical into the ballast tank and water to the nozzles. The nozzles are strategically located in the ballast tank to circulate the ballast water and mix the chemical with the ballast water without removing the ballast water from the ballast tank to a separate mixing
(Continued)

and treatment area located outside the tank either onboard or off of the ship or barge. A controller receives a signal from a flow sensor in the ballast tank to control the one or more pumps to enable operating the nozzles alternately and intermittently to circulate the ballast water and the mix chemical with the ballast water to minimize energy consumption.

20 Claims, 15 Drawing Sheets

(51) Int. Cl.
*C02F 1/50* (2006.01)
*B01F 15/00* (2006.01)
*C02F 103/00* (2006.01)

(52) U.S. Cl.
CPC ......... *B01F 15/00253* (2013.01); *B63J 4/002* (2013.01); *C02F 2103/008* (2013.01)

(56) References Cited

U.S. PATENT DOCUMENTS

| | | | | |
|---|---|---|---|---|
| 4,313,390 | A * | 2/1982 | Yunoki | B63B 11/02 114/125 |
| 4,314,519 | A * | 2/1982 | Yunoki | B63B 11/04 114/125 |
| 5,254,253 | A * | 10/1993 | Behmann | B01F 5/0476 210/151 |
| 6,125,778 | A * | 10/2000 | Rodden | B63B 13/00 114/125 |
| 6,722,933 | B2 * | 4/2004 | Hunter | B63B 13/00 114/74 R |
| 6,773,607 | B2 * | 8/2004 | Russell | C02F 1/70 114/125 |
| 6,773,611 | B2 * | 8/2004 | Perlich | B63J 4/002 210/143 |
| 7,025,889 | B2 | 4/2006 | Brodie | |
| 7,381,338 | B2 | 6/2008 | Van Leeuwen et al. | |
| 7,540,251 | B2 | 6/2009 | Jung et al. | |
| 7,897,045 | B2 | 3/2011 | Nguyen | |
| 8,523,425 | B2 * | 9/2013 | Malmquist | B01F 3/0446 366/165.1 |
| 2004/0134861 | A1 * | 7/2004 | Brodie | B63B 17/00 210/748.11 |
| 2004/0159599 | A1 * | 8/2004 | Hamann | C02F 1/50 210/202 |
| 2007/0158208 | A1 | 7/2007 | Jung et al. | |
| 2009/0139935 | A1 | 6/2009 | Matousek et al. | |
| 2010/0006490 | A1 * | 1/2010 | Fukuyo | B63J 4/002 210/170.11 |
| 2011/0114569 | A1 | 5/2011 | Kim et al. | |
| 2011/0180152 | A1 * | 7/2011 | Dorsch | B08B 9/0933 137/15.05 |
| 2011/0240565 | A1 | 10/2011 | Han et al. | |
| 2014/0021143 | A1 * | 1/2014 | Hummer | C02F 1/02 210/758 |
| 2014/0116962 | A1 * | 5/2014 | Punzo | B63J 4/002 210/748.11 |
| 2015/0336822 | A1 * | 11/2015 | Adams | B63J 4/002 210/749 |
| 2016/0039690 | A1 * | 2/2016 | Lee | B63J 4/002 210/198.1 |
| 2016/0318593 | A1 * | 11/2016 | Hummer | B63J 4/002 |

FOREIGN PATENT DOCUMENTS

| | | | |
|---|---|---|---|
| WO | 2012175452 | 9/2012 | |
| WO | 2012175452 | 12/2012 | |
| WO | WO 2016136828 A1 * | 9/2016 | ............... B01F 5/02 |

OTHER PUBLICATIONS

Mixing Biocides into Ship's Ballast Water—Great Lakes Bulk Carrier Field Trials. Prepared by The Glosten Associates for Isle Royale National Park, Houghton, Michigan, Jan. 17, 2012.
Emergency Response Guide for Handling Ballast Water to Control Non-Indigenous Species. Prepared by the Glosten Associates for National Parks Service, Isle Royale National Park, Houghton, Michigan, Jan. 21, 2010.
Emergency Response Guidance for Handling Ballast Water to Control Aquatic Invasive Species. Prepared by The Glosten Associates for Isle Royale National Park, Houghton, Michigan, Jan. 17, 2012.
International Search Report and Written Opinion (Form PCT/ISA/220), mailed Dec. 6, 2013, in corresponding International Application No. PCT/US13/45560.
International Preliminary Report on Patentability (Form PCT/IPEA/416), mailed Jul. 29, 2014, in corresponding International Application No. PCT/US13/45560.

* cited by examiner

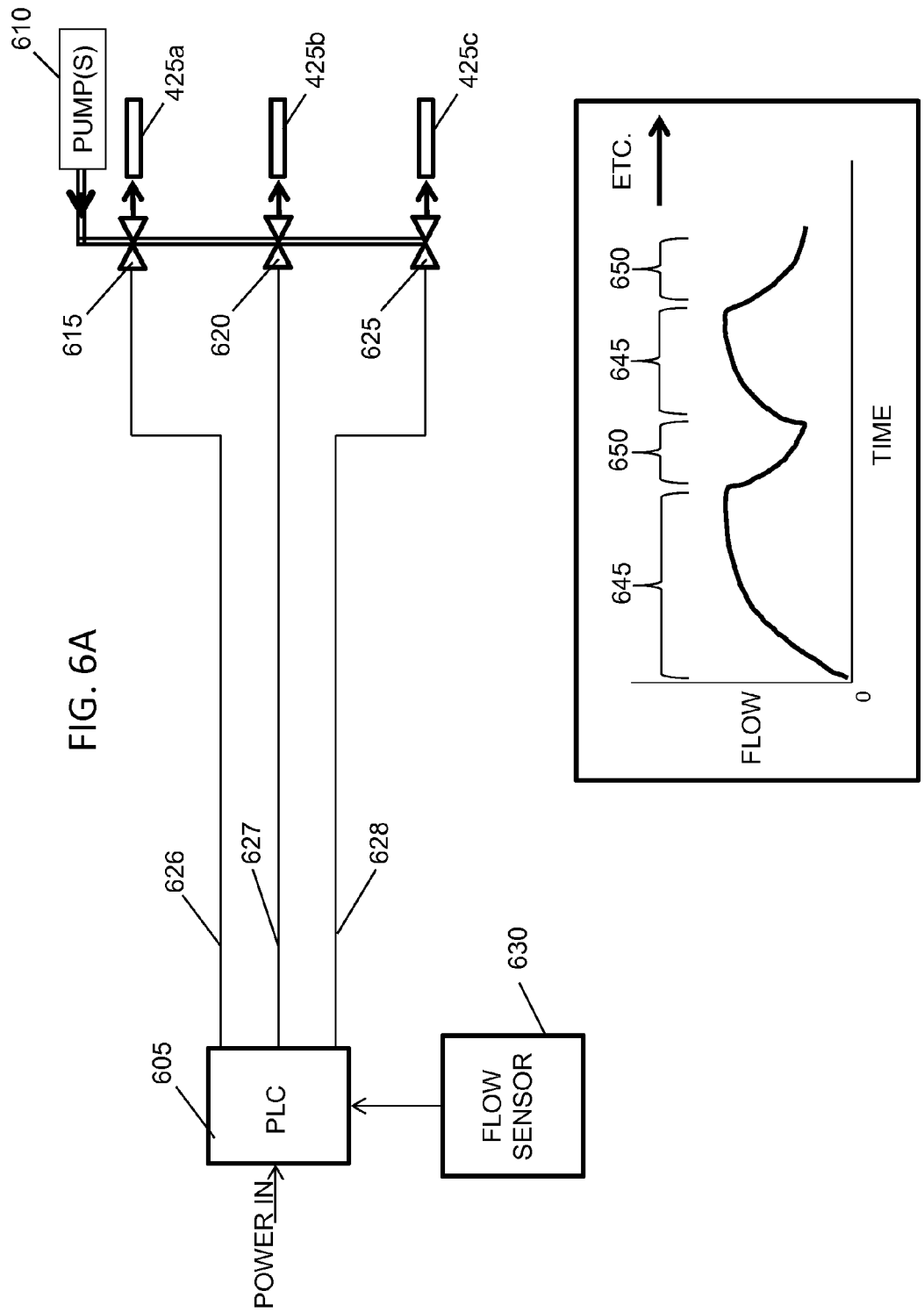

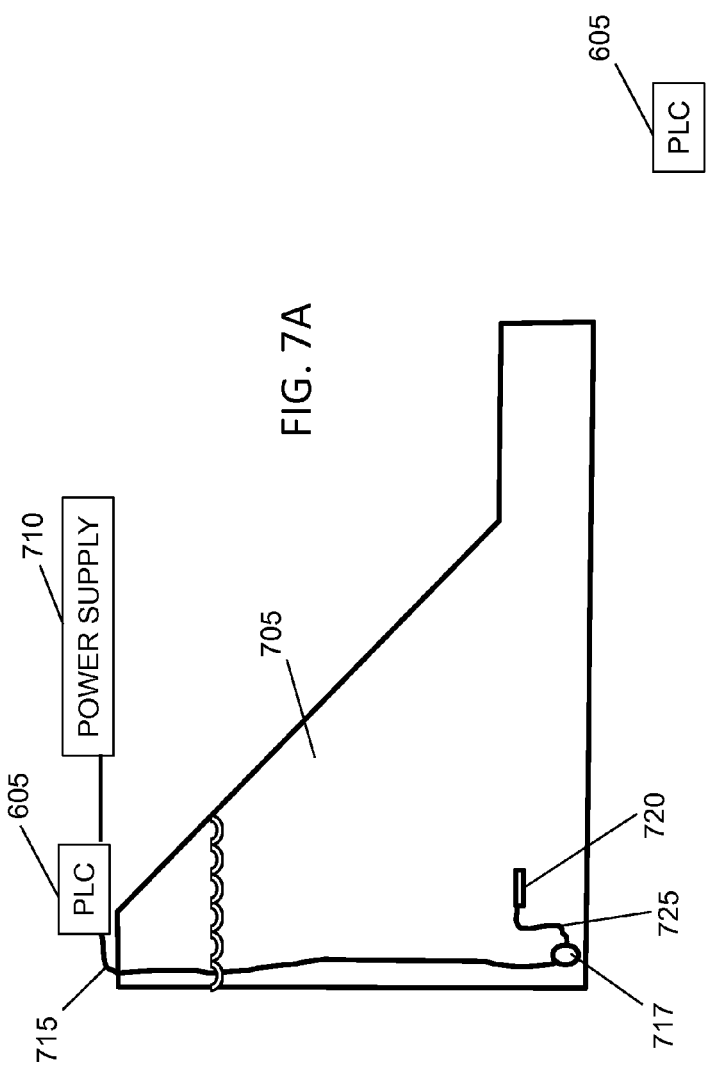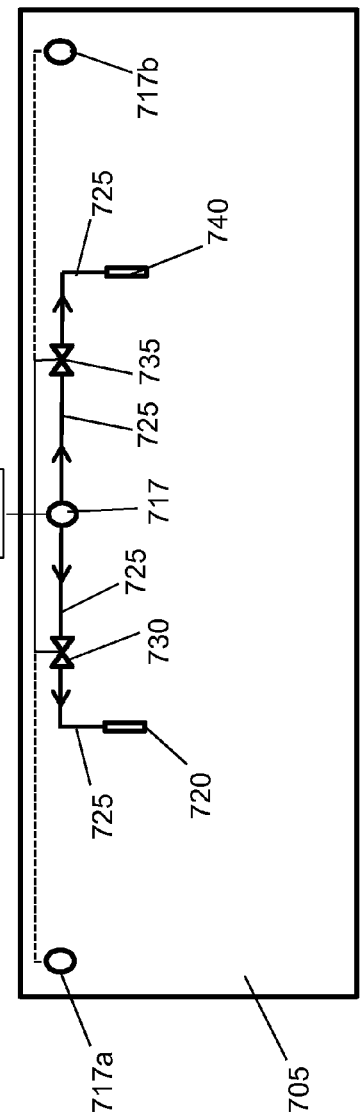

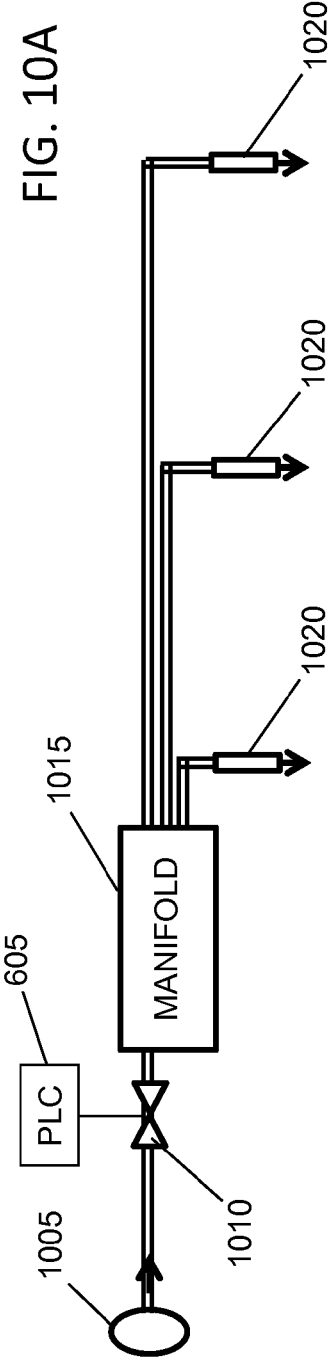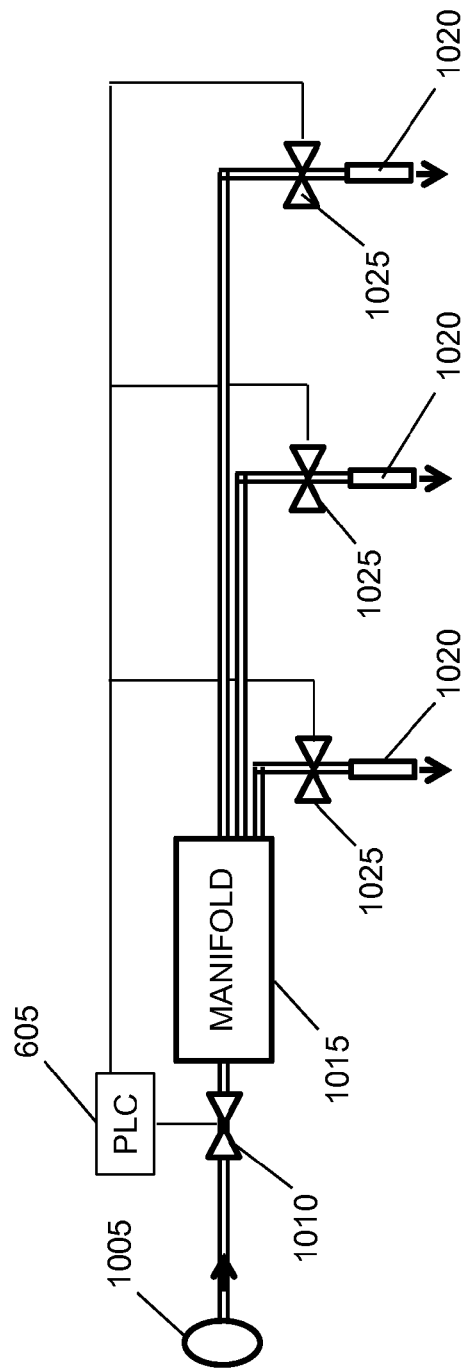

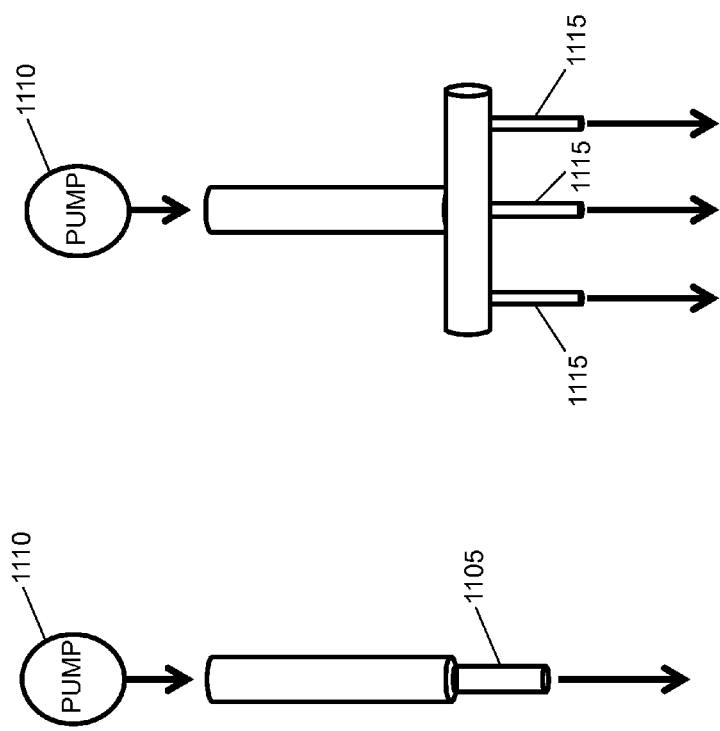

NOZZLE MIXING APPARATUS AND METHODS FOR TREATING WATER IN SHIP BALLAST TANKS

CROSS-REFERENCE TO RELATED APPLICATION(S)

This application claims the benefit of the filing date of U.S. Provisional Patent Application Ser. No. 61/661,158, filed Jun. 18, 2012, which is hereby incorporated by reference in its entirety.

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The invention relates in general to treating water in the ballast tank of a ship or barge.

BACKGROUND

Ships that transport goods around the world can carry nonindigenous (exotic) species in ballast water. The release of the ballast water from the ships is a major transport mechanism for the nonindigenous aquatic organisms (Carlton, 1985) as recognized by the U.S. National Invasive Species Control Act of 1996 (P.L. 104-332). Approximately 70,000 major cargo ships operating worldwide (Bureau of Transportation Statistics, 2008) pump ballast water on board to ensure stability and balance. Large vessels can carry in excess of 200,000 $m^3$ of ballast, which is released in varying amounts at or when approaching cargo loading ports. In 1991, U.S. waters alone received approximately 57,000,000 metric tons of ballast water from foreign ports (Carlton et al., 1994). Ship surveys have demonstrated that ballast water is in general a non-selective transfer mechanism—many taxa representing planktonic and nectonic organisms capable of passing through coarse ballast water intake screens are common. These include bacteria, larval fish, zooplankton, and bloom forming dinoflagellates (Chu et al., 1997; Carlton and Geller, 1993).

The introduction of the nonindigenous (exotic) species has had dramatic negative effects on marine, estuarine, and freshwater ecosystems in the United States and abroad (Elton, 1958; Mooney and Drake, 1986; Chesapeake Bay Commission, 1995; NAS, 1996). Effects include alteration of the structure and dynamics of the ecosystem involved, including extirpation of native species (Office of Technology Assessment Archive, 1993).

The current state of the art for treating ballast water involves treating the water as it is pumped into or out of the ballast tanks. Methods for treating the water as it is pumped out the tanks are tremendously expensive and time consuming, and it is considered cost prohibitive to treat all water that is pumped into all tanks. The alternative to treating the water as it is pumped into or out of the tanks is to treat it while it resides in the tanks as the ship travels from port to port. To accomplish this, the entire volume of the tanks must be completely mixed in a relatively short time to ensure all the water in the tanks is exposed to the treatment method. This is especially true in emergency situations when a ship is grounded and the water in the ballast tanks must be treated before it is pumped out as part of the response plan to free the grounded vessel.

Methods for mixing water in tanks as part of a treatment process have been developed to treat waste water from municipal sewage systems, manufacturing, and industry. These treatment methods generally incorporate large circular or square tanks to hold the water during treatment, mixing, and neutralization (if required) before the water is released. These tanks generally lack geometric complexity and are therefore relatively easy to mix using a variety of mechanical methods (i.e. axial mixers, eductors, air, and nozzles). The ballast tanks on ships are quite different. The tanks are engineered to be part of the structure of the ship and are integral to the stability and integrity of the ship. As a result, most ships have multiple ballast tanks (ranging in number from a few to dozens) that are geometrically complex and often have baffles, support structures, web frames, stringers, stations, piping, and rose boxes inside the tanks. Also, there can be different types of ballast tanks with different geometries on a single ship. This complexity makes it difficult to mix the water in the tanks as part of a treatment method. Moreover, there are about 70,000 cargo ships operating worldwide. It would cost the shipping industry billions of dollars to install and maintain permanent mixing systems in all ballast tanks on all ships.

SUMMARY

A system, method, and apparatus for treating ship ballast water is presented herein. The system includes a ballast tank that stores ballast water and one or more nozzles located in the ballast tank. A pump supplies water to the nozzles and a biocide is injected into the water supplied to the nozzles or directly into the tank at alternative locations. The nozzles are strategically located in the ballast tank to circulate the ballast water and mix the chemical with the ballast water without removing the ballast water from the ballast tank. The nozzles may be operated alternately and intermittently to reduce equipment weight and power requirements and to optimize mixing rates.

The nozzle mixing system can be implemented on an "as needed" basis, is relatively inexpensive to purchase and maintain, is simple to implement, is effective at quickly (a few hours) mixing the contents of the tank, and reduces exotic species introductions and provides improved control of those species introduced in the past.

The nozzle mixing system and method enhances the mixing of ballast water tanks. Enhanced mixing is needed to 1) ensure all water in the tank is adequately mixed with a biocide for the required exposure time, 2) ensure the biocide is adequately mixed with a neutralizing agent (if required) before the water is released into the environment, 3) improve saltwater exchange efficiency as a means of preventing the spread of exotic species from port to port, and 4) facilitate the suspension of accumulated sediments in the tanks to enhance the efficacy of biocide treatment of exotic species that may be present in the sediment.

BRIEF DESCRIPTION OF THE DRAWINGS

Various aspects and advantages of the invention will become apparent from the following detailed description, taken in conjunction with the accompanying drawings. The drawings are not necessarily drawn to scale. In the drawings:

FIG. 6A is a diagram showing flow of water from pumps to nozzles according to an embodiment of the invention;

FIG. 6B is a graph illustrating determination of establishment of circulation currents in a ballast tank;

FIG. 7A is a schematic cross-sectional view of a ballast tank illustrating control of flow of water from a submersible pump to a nozzle according to an embodiment of the invention;

FIG. 7B is a schematic top view of the ballast tank shown in FIG. 7A according to an embodiment of the invention;

FIG. 10A is a diagram illustrating control of flow of water to nozzles using a single valve according to an embodiment of the invention;

FIG. 10B is a diagram illustrating control of flow of water to nozzles using multiple valves to achieve intermittent or continuous operation of all nozzles together according to an embodiment of the invention;

FIGS. 11A and 11B are schematic diagrams showing alternative nozzle configurations according to embodiments of the invention;

DETAILED DESCRIPTION

Figure 1:
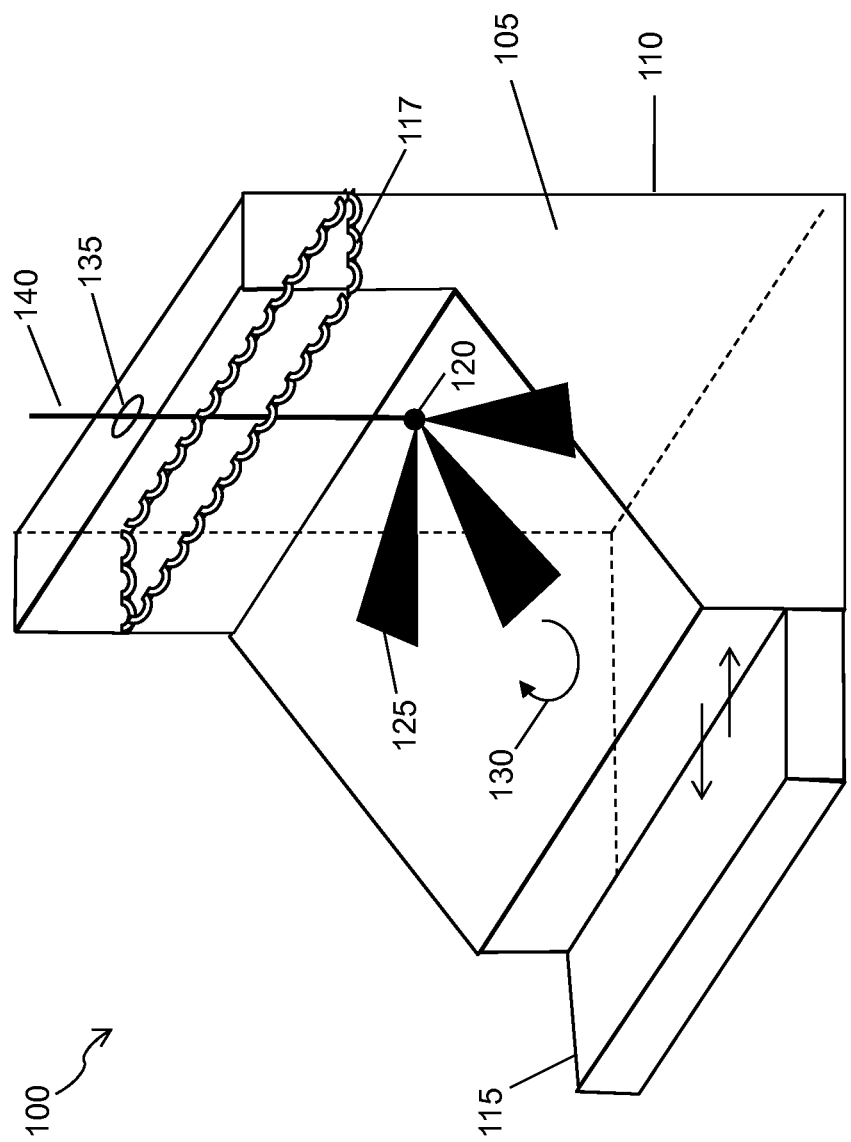
FIG. 1 is a schematic perspective view of a ship ballast tank with a nozzle mixing system according to an embodiment of the invention.

FIG. 1 is a schematic perspective view of a nozzle mixing system 100 employed in a typical ballast tank 105 having a seaward wall 110, a double-bottom area 115, and a water level 117. The nozzle mixing system 100 uses one or more nozzles 120 strategically placed inside the ballast tank 105 to deliver jets 125 of water. The type of nozzles 120, location of the nozzles 120, and volume and pressure of the water coming from the nozzles 120 create a circulation current 130 inside the tank 105. The currents 130 developed by the transfer of the energy from the water jets 125 delivered by the nozzles 120 to the water in the ballast tank 105 result in complete mixing of all the water in the ballast tank 105 in a relatively short time (i.e., a few hours). The design of the nozzle mixing system 100 is dependent on the geometry and size of the particular ballast tank that is being mixed. The nozzle type, location of the nozzles in the tanks, and the pressure and volume of water delivered to the nozzles are a function of the environment in which the nozzles will be implemented.

The nozzles 120 can be permanently installed in the ballast tank 105 when it is empty, or they can be lowered into the tank 105 before filling, during filling, or when it is full of water through inspection/access ports 135 located in the top of the tank 105. The inspection/access ports 135 are accessible from the deck of the ship or through other hatches or openings in the bulk heads that may separate various components of the ballast tank. This latter type of deployment does not require any modification to the ship. Water is conveyed to the nozzles 120 through pipes/hoses 140. Water to supply the nozzles 120 can be obtained from 1) an existing firefighting water supply system on the ship, 2) a submersible pump lowered into the ballast tank 105, 3) a pump drawing water through a bulkhead connection into the lower portion of the ballast tank 105 via access through the maintenance or conveyor tunnels found on most cargo ships, and 4) inline pumps on the deck of the ship, such as jet pumps, diaphragm pumps, axial flow pumps, turbine pumps, gear pumps, piston pumps, centrifugal pumps, etc. Water supply to the nozzles is discussed in greater detail below.

The double-bottom area 115 is typically only about five feet to six feet in height depending on the construction of the ship. Previous mixing methods have had difficulty mixing the water in double-bottom areas. However, the nozzle mixing system 100 generates hydraulic mixing of all portions of the tank 105, as explained below.

The objective of using nozzles for mixing is to impart an impulse force F from a single or multiple set of nozzles to provide the power needed to overcome resistive forces related to fluid drag over tank components by the receiving flow in motion. Multiple versus single nozzles operate at relatively high energy transfer efficiencies, and moderate velocity through the nozzles provides superior transfer efficiencies when compared to very high velocities through the nozzles. Further, establishing a rotary circulation or vortex within the tank is desirable to minimize mixing time rather than creating flow patterns that result in distorted non-circular or rectangular flow cells. Non-circular or rectangular flow cells act to establish bidirectional or opposing flow fields and thus increase power requirements due to fluid shear. Ship ballast tanks are not designed for optimal mixing. Rather, they are designed to add strength to the hull of the ship to withstand roll, pitch, and yaw forces while retaining liquid ballast volumes needed for stability. The nozzle mixing system 100 exploits the structure of ballast tanks, particularly transverse structural web frames, to avoid the drag related to bidirectional flow, as well as to help approximate mixing circulation cells that are stable, predictable, and that require reasonable levels of energy input.

Figure 2:
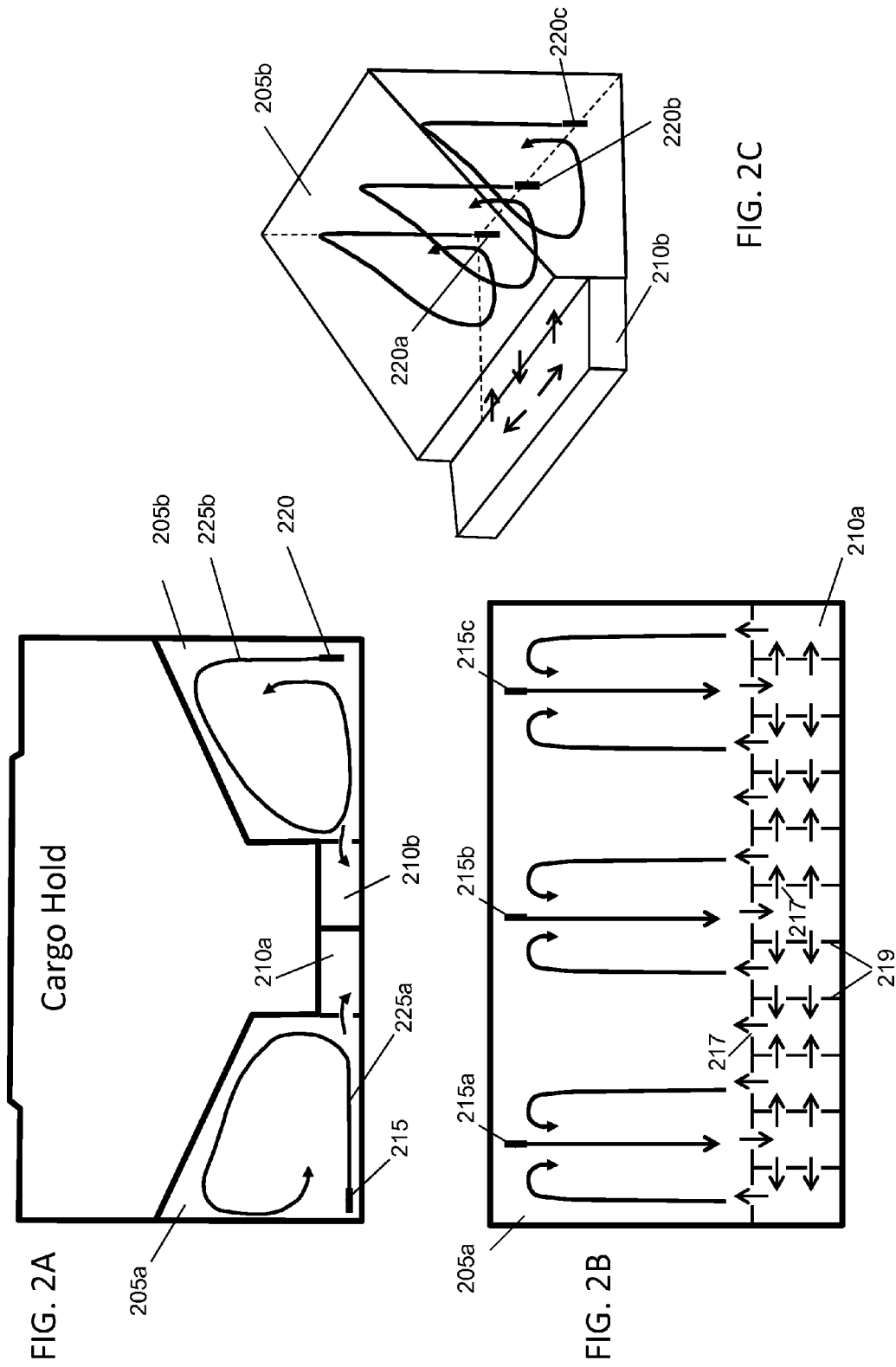
FIG. 2A is a schematic cross-sectional view of a cargo ship illustrating mixing of water in two ballast tanks with double-bottom areas according to an embodiment of the invention.
FIG. 2B is a schematic top view of one of the ballast tanks shown in FIG. 2A illustrating placement of nozzles according to an embodiment of the invention.
FIG. 2C is a schematic perspective view of the ballast tank of FIG. 2B according to an embodiment of the invention.

FIG. 2A is a schematic cross-sectional view of a cargo ship illustrating two ballast tanks 205a and 205b, each having a double-bottom area 210a and 210b, respectively. The tanks 205a and 205b are structurally isolated from one another, and have dimensions of, for example, about 140 feet in length, 50 feet in width, and 30 feet in depth. Each of the ballast tanks 205a and 205b illustrates two different nozzle orientations. Nozzle 215 in tank 205a is oriented horizontally, and nozzle 220 in tank 205b is oriented vertically. Flow from the nozzles 215 and 220 transfers energy either horizontally or vertically, respectively, to establish transverse rolls 225a and 225b within the tanks 205a and 205b.

FIG. 2B is a schematic top view of the tank 205a. In the embodiment shown in FIG. 2B, three nozzles 215a, 215b, and 215c divide the tank 205a into three mixing cells that impart energy and flow into the hard to mix double-bottom area 210a. Water is not jetted directly into the double-bottom area 210a because this results in rapid energy dissipation due to the presence of regularly spaced stiffeners and bulk heads (not shown) in the double-bottom area 210a, although in some cases this may result in enhanced mixing depending on the geometry of the tank and nozzle orientation. Water moves in and out of the double-bottom area 210a and between sections within the double-bottom area via lightening holes 217 in web frames 219. FIG. 2C is a schematic perspective view of tank 205b with nozzles 220a, 220b, and 220c located near the bottom of the tank.

The arrows in FIGS. 2A to 2C show that the energy transferred from the water delivered by the nozzles, in either orientation, to the water in the tanks 205a and 205b establishes transverse flow and circulation currents to facilitate complete mixing of all water in the tanks 205a and 205b.

Figure 3:
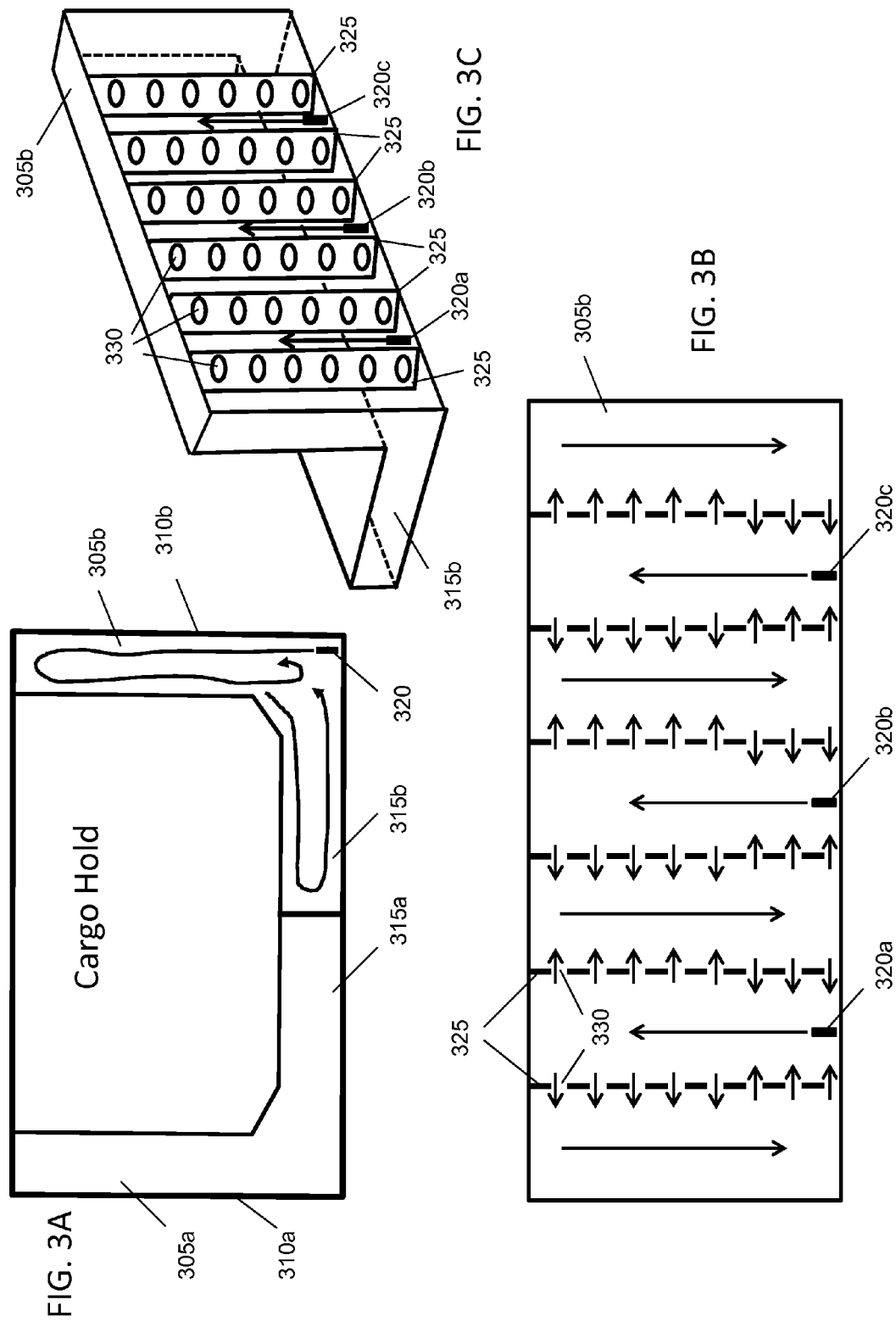
FIG. 3A is a schematic, cross-sectional view of a cargo ship with two L-shaped ballast tanks according to an embodiment of the invention.
FIG. 3B is a schematic side view of one of the ballast tanks shown in FIG. 3A illustrating placement of nozzles and illustrating mixing of water according to an embodiment of the invention.
FIG. 3C is a schematic perspective view of the ballast tank of FIG. 3B according to an embodiment of the invention.

FIGS. 3A, 3B, and 3C illustrate mixing of L-shaped ballast tanks. FIG. 3A is a schematic, cross-sectional view of a cargo ship with two L-shaped ballast tanks 305a and 305b having seaward sides 310a and 310b and double-bottom areas 315a and 315b, respectively. Tank 305b shows the placement of a nozzle 320 in a vertical orientation. FIG. 3B is a schematic side view of the seaward wall of the tank 305b and FIG. 3C is a schematic perspective view of the tank 305b, both illustrating placement of three nozzles 320a, 320b, and 320c. The nozzles 320a, 320b, and 320c operate vertically in this embodiment to induce flow laterally among transverse web frames 325 that are coupled, hydraulically, by lightening holes 330 in the web frames 325. The surfaces of the web frames 325 prevent drag related to opposing flow streams and hence provide for mixing with relatively low power requirements.

The arrows in FIGS. 3A to 3C show that the energy transferred from the water delivered by the nozzles 320a, 320b, and 320c to the water in the tank 305b establishes a transverse flow and circulation current to facilitate complete mixing of all water in the tank 305b. Water moves in and out of adjacent areas through the lightening holes 330 in the web frames 325 between the tank sections. The circulation currents in the vertical part of the tank 305b pull water out of the double-bottom area 315b as shown in FIG. 3A. Mixing of the double-bottom area 315b is not depicted in FIG. 3C.

Figure 4:
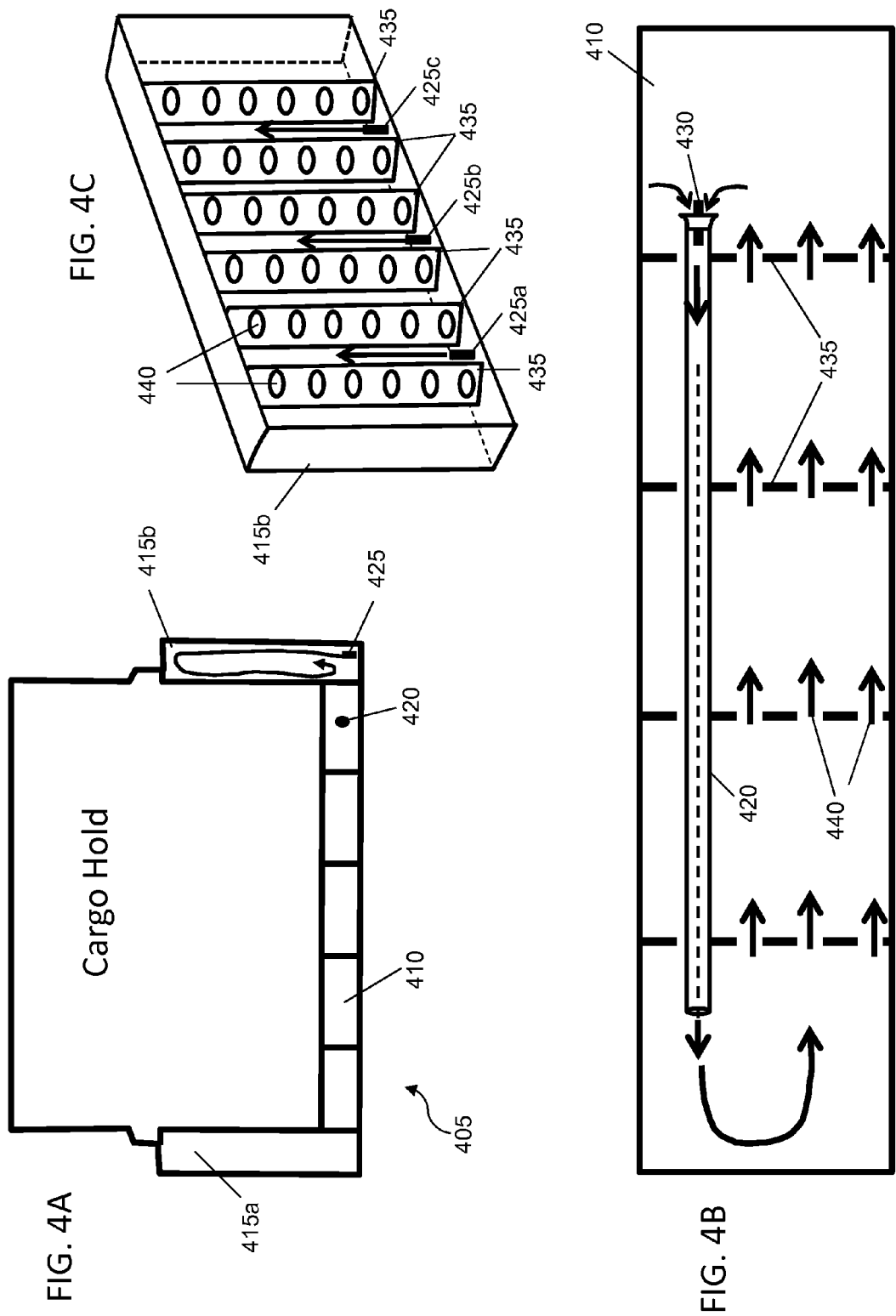
FIG. 4A is a schematic cross-sectional view of a cargo ship having a double-bottom ballast tank with width-to-height ratios that preclude establishment of a sufficient number of rotating fluid cells or vortexes.
FIG. 4B is a schematic top view of the double-bottom area of the ballast tank of FIG. 4A showing placement of a nozzle at an entrance of a pipe and mixing of water according to an embodiment of the invention.
FIG. 4C is a schematic perspective view of a seaward wall section of one of the ballast tanks shown in FIG. 4A illustrating placement of nozzles according to an embodiment of the invention.

FIGS. 4A, 4B, and 4C illustrate mixing of a double-bottom ballast tank 405 that has a width to height ratio that precludes the establishment of a sufficient number of rotating fluid cells or vortexes. FIG. 4A is a schematic cross-sectional view of a cargo ship having the ballast tank 405, a double-bottom area 410, two seaward wall sections 415a and 415b, a pipe 420, and a nozzle 425. FIG. 4B is a schematic top view of the double-bottom area 410 showing a nozzle 430 at an entrance of the pipe 420, web frames 435 between tank sections, and lightening holes 440. FIG. 4C is a schematic perspective view of the seaward wall section 415b illustrating placement of nozzles 425a, 425b, and 425c.

Mixing is achieved in this embodiment by using the nozzle 430 to direct water from one end of the tank 405 to the opposite end, which forces water to move through each tank subsection via the lightening holes 440 in the web frames 435 to complete a circulation cell. In the double-bottom area 410, the nozzle 430 directs water inside the pipe 420 and the energy at the end of the pipe 420 causes water to move between adjacent areas through the lightening holes 440 in the web frames 435. Mixing in this type of tank occurs due to displacement and dispersion and typically requires two to four complete exchanges to ensure complete mixing of all the water in the tank. There is only one double-bottom ballast tank shown in FIGS. 4A to 4C. For a ship having two double-bottom tanks that are nearly hydraulically isolated, mixing is achieved by implementing the embodiment shown in FIG. 4B in each of the separate tanks.

The arrows in FIGS. 4A to 4C show that the energy transferred from the water delivered by the nozzles 430, 425a, 425b, and 425c to the water in the tank 405 is sufficient to establish a transverse flow and circulation current to facilitate complete mixing of all water in the tank 405.

Figure 5:
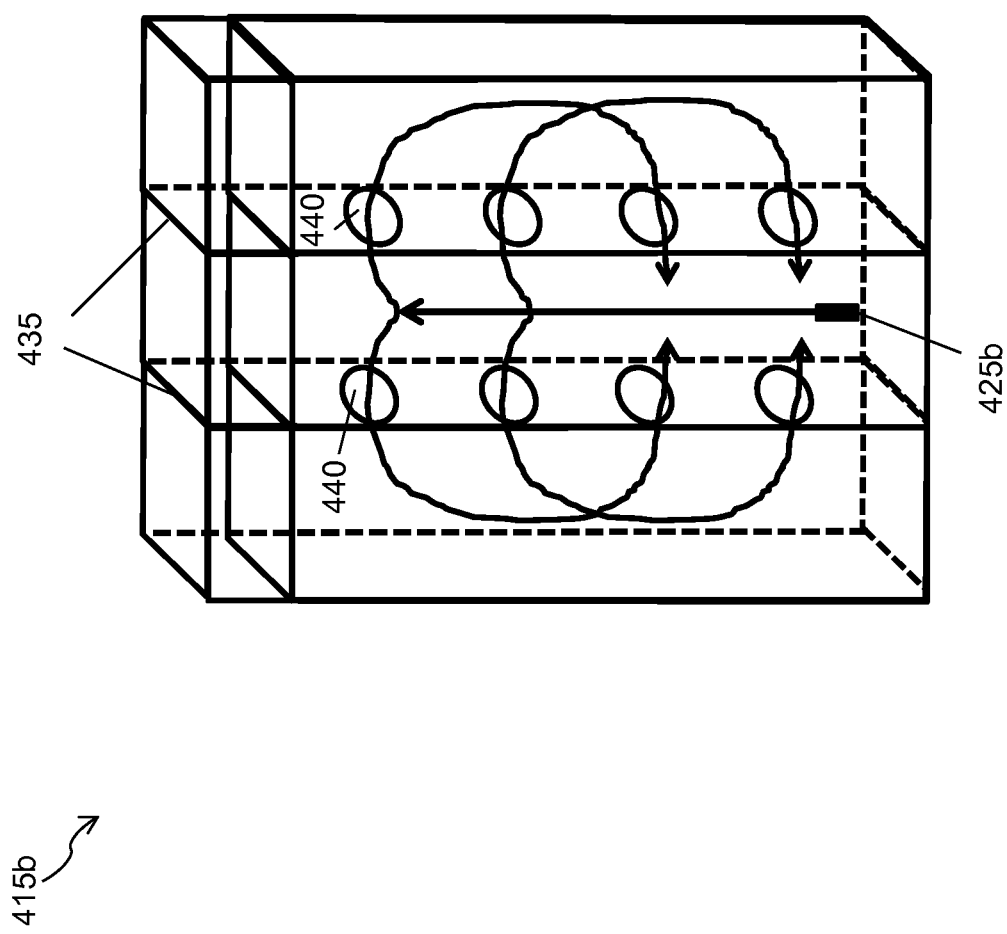
FIG. 5 is a schematic perspective view of a portion of a seaward section of the ballast tanks shown in FIGS. 3C and 4C according to an embodiment of the invention.

FIG. 5 is a schematic perspective view of a portion of the seaward section of the ballast tanks shown in FIGS. 3C and 4C. For purposes of illustration, seaward wall section 415b is discussed in relation to FIG. 5. The arrows show that the movement of water resulting from the energy transferred from the water delivered by any of the nozzles, for example, the nozzle 425b, to the water in the tank section 415b establishes a transverse flow and circulation current to facilitate complete mixing of all water in the tank section 415b. The transfer of energy causes water to move between adjacent areas through the lightening holes 440 in the web frames 435 between the tank sections.

Ballast tanks are engineered to be part of the structure of the ship and are integral to the stability and integrity of the ship. As a result there are often multiple types of ballast tanks on a ship that are geometrically complex depending on the baffles and support structures inside the tank. Of the approximately 70,000 ships currently engaged in global trade, the variety of tank geometry is vast.

The nozzle mixing system disclosed herein uses currents developed by the transfer of energy from the water delivered by the nozzles to the water in any tank to completely mix all water in the tank in a relatively short time to facilitate the introduction of biocides and biocide neutralizing agents within the tank so the water can be treated, tested and de-ballasted in accordance with ballast discharge standards. This system does not require the water to be removed from the tank and delivered to a separate mixing and treating system located on or off the ship. Rapid mixing is required since some biocides being considered for killing invasive species have a short half-life. Thorough mixing of the water in the tank requires specifying the type of nozzles used, the locations of the nozzles in the tank, and the pressure and volume of water delivered to the nozzles. All of these specifications are a function of the environment in which the nozzle mixing method is implemented.

The number of nozzles used is determined by the geometry of the particular ballast tank and the shape and abundance of the internal web frames in the tank. The embodiments shown in FIGS. 2C, 3C, and 4C show the use of three nozzles to establish the necessary energy to mix the portion of the tank that is adjacent to the seaward wall of the side of the ship. However, if the tanks are longer or contain more internal web frames, more nozzles may be required. Ultimately, the objective is to install the minimum number of nozzles needed to mix the tank in an efficient and timely manner with the minimum energy input into the mixing system.

The placement of the nozzles is dependent upon the environment in which they will be used. Ultimately, the type, location, and pressure and volume of the water delivered to the nozzles is designed to generate a vertical circulation current in the tank that mixes all the water in the tank in a relatively short time. The currents that are established by the nozzles result in water being pulled out of areas in the tank that are otherwise isolated by the baffles and support structures inside the tank.

The location of the nozzles is based on the geometry of the tank, the water level in the tank, and the shape and abundance of internal web frames in the tank. Simply placing nozzles on the sides or bottom of a tank will not ensure complete mixing of the water in the tank. The nozzles need to be strategically placed to ensure complete mixing. Also, simply using pumps to draw water from one part of the tank and reintroducing water back into the tank, thereby establishing a circulation loop, results in inconsistent results, extended periods of time to ensure complete mixing, and requires specialized pumps, hoses, pipes, and expensive retrofitting to the ship's infrastructure.

Minimizing the amount of energy the nozzle mixing system requires and the weight of the system is a primary objective given (1) the limited energy resources and high cost of energy available on board the ship, and (2) the need to subtract equipment weight from cargo potential of the ship. Equipment weight and power requirements can be reduced by imparting a strategy of intermittent nozzle operation, rather than the standard continuous operation mode, during the treatment period.

Intermittent operation is achieved by diverting water, for example, from a single submersible pump located in the ballast tank alternately to one or the other of a strategically positioned pair of nozzle assemblies within the same tank. Water routing is achieved through use of powered on/off or 3-way control valves regulated by a time-based control system, such as a programmable logic controller (PLC). Switching frequencies and duration are related to system volume, geometry, and nozzle operating conditions and thus are dependent upon the particular ballast tank. The mixing rate in different regions of the ballast tank is optimized by altering nozzle activation times when one side of the tank has more drag-related structure than the other side. Alternatively, a single nozzle or group of nozzles served by a single dedicated pump can operate intermittently by intermittently powering the pump with a time-based controller that regulates electrical service.

Energy transfer improves as velocity differentials between the bulk circulating flow and the nozzle velocity increases. Given hydraulic drag effects within the tank will slow bulk fluid velocities after nozzle flow has been terminated, reactivation of the nozzles, intermittently, will result in nozzle flows interacting with bulk flows that are not constant but vary with time and are relatively low, on average. Further, once the bulk circulating flow is established, the kinetic energy of the bulk flow will allow for the continued mixing and blending once nozzle flows have been redirected or terminated.

The location and number of pumps supplying water to the nozzle(s) can also be optimized to minimize the energy requirements of the mixing system and ensure complete mixing in areas of the tank that are nearly hydraulically isolated. Geometrically complex tanks often result in areas in the tank that are somewhat isolated and difficult to mix. For these tanks, using a single pump could be more efficient than using two pumps located in separate areas of the tank. A single pump located in the area that is difficult to mix would be used to draw water from this area and deliver it to one or more nozzles located elsewhere in the tank. The energy transferred from the nozzles to the water in the tank would result in water circulating back into the area where the pump is located. A pump drawing water from an area that is difficult to mix to supply water to nozzles in other locations combined with the mixing effect of the rotary circulation currents generated by the nozzles is sufficient to thoroughly mix all areas of the tank in an efficient manner with a single pump.

FIG. 6A is a diagram showing a Programmable Logic Controller (PLC) 605 used to control the flow of water from one or more pumps 610 to the nozzles, such as nozzles 424a, 425b, and 425c illustrated in FIG. 4C, through valves 615, 620, and 625. The PLC 605 is a time-based or time-based plus velocity-based controller positioned outside of the ballast tank. A return signal may be used at the PLC 605 to indicate valve positions. Lines 626, 627, and 628 transmit power source/signals respectively to each of the on/off valves 615, 620, and 625 used to control the flow of water from the pump 610 to the nozzles 425a, 425b, and 425c. The number of nozzles used depends upon the application of the mixing technology.

Also shown in FIG. 6A is a flow sensor 630 that can be used in the tank to provide a signal back to the PLC 605. FIG. 6B is a graph illustrating that the flow sensor 630 can be used to determine when circulation currents have been established in the tank (as represented by curve 645) and to turn the supply of water on and off as needed (as represented by curves 645-650-645-650, etc. in succession) to maintain the necessary flow from the nozzles to keep the circulation currents established. Turning the system on and off minimizes energy consumption of the system but maintains the velocities necessary for mixing. The flow sensor 630 in the tank can be used to indicate the condition of the bulk solution velocity and can be used to signal turning the valves 615, 620, and 625 on and off to minimize the energy needs of the mixing system.

FIG. 7A is a schematic cross-sectional view of a typical ballast tank 705 showing a power supply 710, the PLC 605, and a power line 715 to a submersible pump 717. Water from the pump 717 moves to a nozzle 720 through pipes/hoses 725.

FIG. 7B is a schematic top view of the ballast tank 705. The PLC 605 controls valves 730 and 735 and the submersible pump 717. Water moves from the pump 717, through the valves 730 and 735, to the nozzles 720 and 740 through the pipes/hoses 725. The single pump 717 in this embodiment can supply water to both nozzles 720 and 740 simultaneously or one at a time, alternately, as directed by the PLC 605. Alternating operation of the nozzles 720 and 740 can reduce the energy demands of the system as discussed above. Alternative locations of the pump, shown as pump 717a and 717b, can be used to minimize the energy requirements of the mixing system and ensure complete mixing in areas of the tank 705 that are nearly hydraulically isolated. A single pump, such as pump 717a or 717b, located in an area that is difficult to mix can be used to draw water from this area and deliver it to one or more nozzles located elsewhere in the tank 705.

Figure 8:
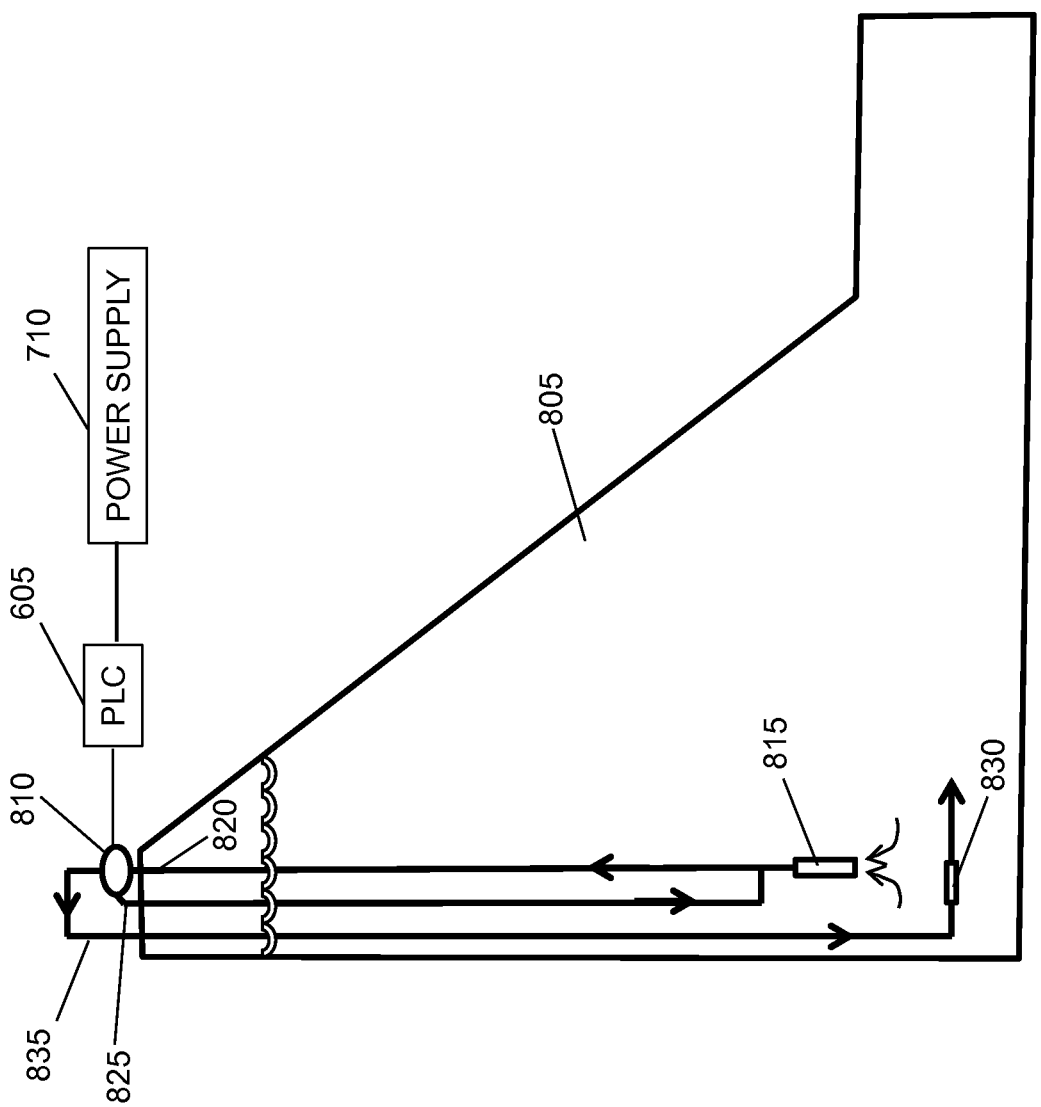
FIG. 8 is a schematic, cross-sectional view of a ballast tank showing placement of a jet pump on a deck of a ship according to an embodiment of the invention.

FIG. 8 is a schematic, cross-sectional view of a ballast tank 805 showing placement of a jet pump 810 on the deck of a ship. Using the jet pump 810 eliminates the need to supply electrical power down into the tank 805 that would otherwise be needed if a submersible pump is used. In this embodiment, the power supply 710 supplies power to the PLC 605 that controls operation of the jet pump 810. Water is drawn from the tank 805 through an inlet 815 containing a check valve. Recirculating flow in two parallel lines 820 and 825 is used to supply water to a nozzle 830 through a pipe/hose 835. To establish recirculating flow in lines 820 and 825, line 820 is primed with water from a surface-supplied line such as a hose from the ship's fire suppression system.

Figure 9:
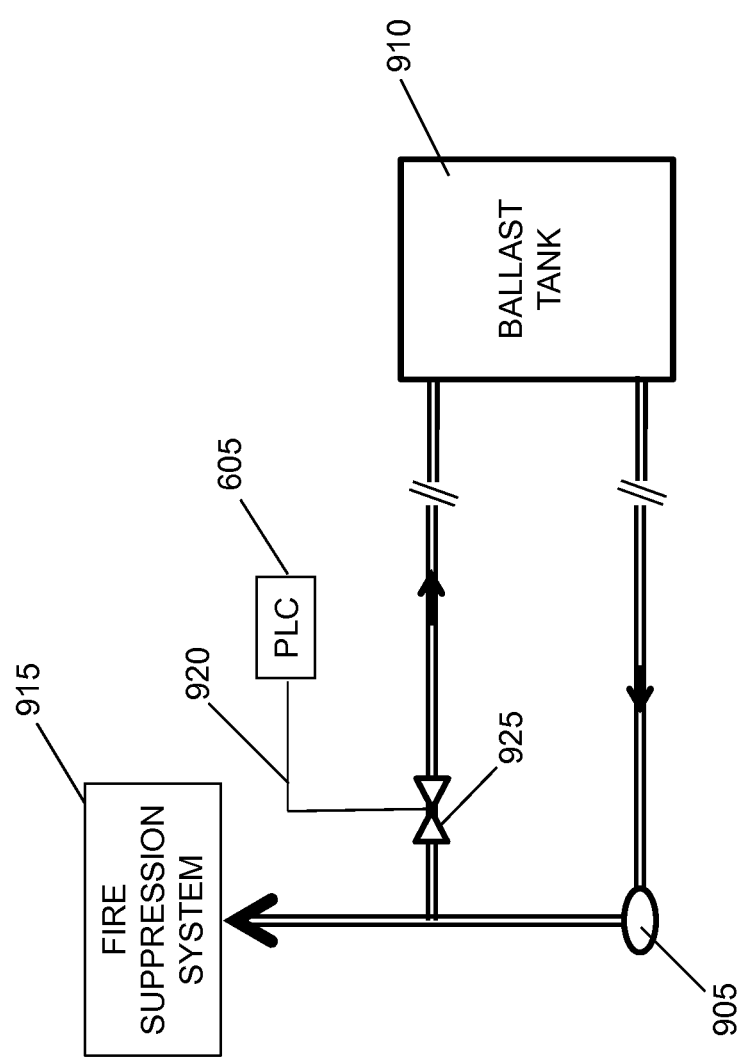
FIG. 9 is a diagram showing a fire suppression pump in an engine room of a ship used to provide water to the nozzle mixing system in a ballast tank according to an embodiment of the invention.

FIG. 9 is a diagram showing a fire suppression pump 905 in the engine room of the ship used to provide water to the nozzle mixing system in a ballast tank 910. Water is drawn from the ballast tank 910 by the pump 905 used for the ship's fire suppression system 915. A hose/pipe 920 is used to bypass water through a valve 925 that is controlled by the PLC 605.

FIGS. 10A and 10B are diagrams showing alternatives to controlling flow of water to nozzles. In FIG. 10A, water from a pump 1005 is controlled by a single valve 1010 that is operated by the PLC 605. Water flows from the valve 1010 through a manifold 1015 to achieve intermittent or continuous operation of all nozzles 1020 together. In FIG. 10B, additional valves 1025 controlled by the PLC 605 are added between the manifold 1015 and the nozzles 1020 to achieve independent operation of the nozzles intermittently or continuously.

FIGS. 11A and 11B are schematic diagrams showing alternative nozzle configurations. In FIG. 11A, a single nozzle 1105 is used to convey water from a pump 1110 into the ballast tank. In FIG. 11B, multiple smaller nozzles 1115 are used to convey water from the pump 1110 into the ballast tank. The thrust generated by the nozzles (which can be significant) should be considered when installing them in the ballast tank to ensure that they remain in the desired locations and orientations. Those familiar with fluid mixing will understand that there are various ways to negate nozzle thrust.

Figure 12B:
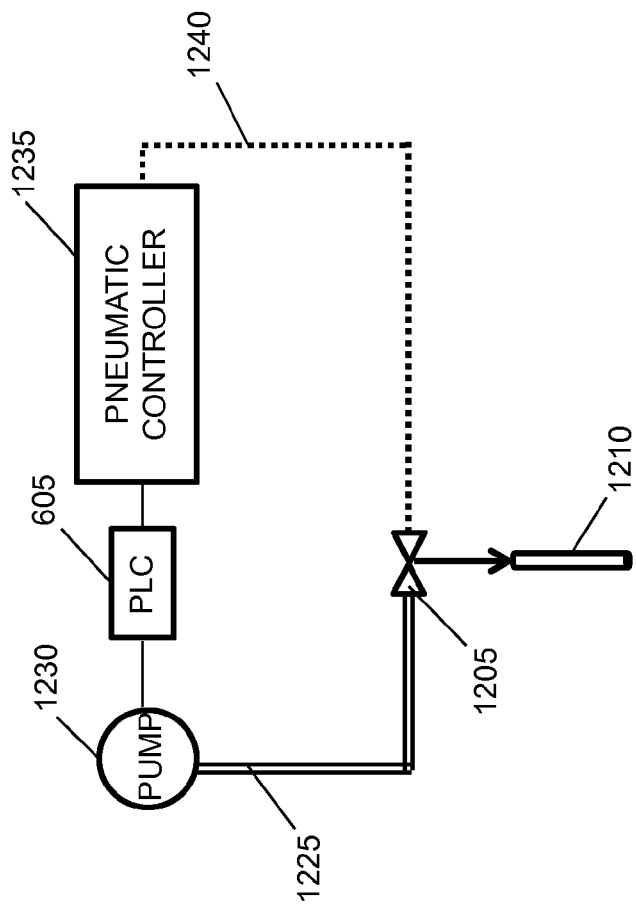
FIGS. 12A and 12B are diagrams showing alternative configurations for controlling operation of a valve that supplies water to a nozzle to achieve intermittent or continuous flow through the nozzle according to an embodiment of the invention.
Figure 12A:
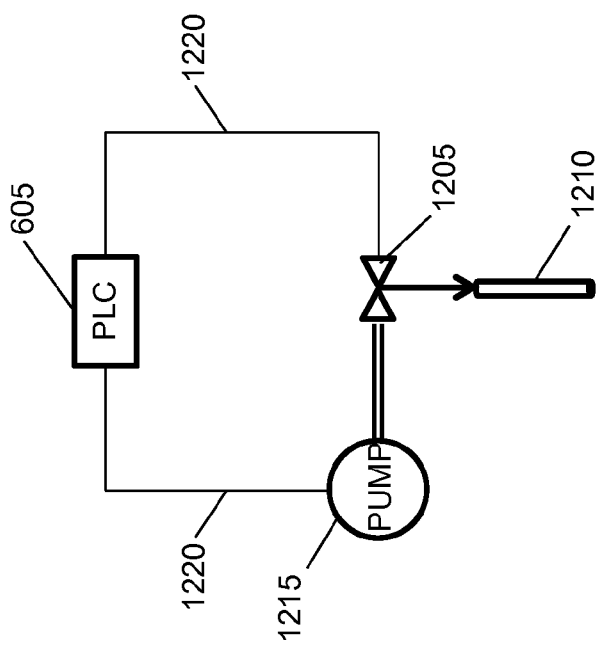

FIGS. 12A and 12B are diagrams showing alternatives for controlling the operation of a valve 1205 that supplies water to a nozzle 1210 to achieve intermittent or continuous flow through the nozzle 1210. In FIG. 12A, the PLC 605 is attached to a submersible pump 1215 and the valve 1205 by a signal/power source cable 1220. To actuate and control the pump 1215 and the valve 1205, the PLC 605 sends and receives electricity through the cable 1220. A configuration that eliminates installation of electrical components underwater in the ballast tank is shown in FIG. 12B. In this embodiment, water is delivered through the valve 1205 to the nozzle 1210 via a pipe/hose 1225 from a jet pump 1230 located on the deck of the ship. The valve 1205 is operated by a pneumatic controller 1235 on the deck of the ship that is controlled by the PLC 605. An air line 1240 connects the pneumatic controller 1235 and the valve 1205. Controlling the operation of the valves to supply water to the nozzles to achieve intermittent or continuous flow through the nozzles can be applied to any of the embodiments described above.

The advantages of the nozzle mixing system disclosed herein include the following:

1) the components of the nozzle mixing system are inexpensive;

2) there are few parts that require maintenance or repair;

3) the nozzle mixing system needs relatively inexpensive redesign or modification to the ship compared to dedicated pre- or post-treatment systems that are integrated into the infrastructure of the ship;

4) if permanent installation is desired, the installation and maintenance of the nozzle mixing system as a permanent part of the ship's infrastructure is inexpensive;

5) the nozzle mixing system is portable and can be moved from tank to tank as needed so one system can be used to mix multiple tanks onboard a ship, and the portability of the nozzle mixing system facilities its use in emergency situations such as groundings;

6) the nozzle mixing system can be integrated with the existing firefighting system on board the ship to reduce the amount of equipment needed to implement the system;

7) the nozzle mixing system can be modified to mix different ballast tank configurations;

8) the nozzle mixing system can be used to introduce biocides into the ballast tanks by injecting the biocide into the stream used to supply water to the nozzles;

9) the ballast tank water does not need to be continuously removed, sent through a treatment system, and returned to the tank—complete mixing can be achieved with the nozzles alone; and 10) the nozzle mixing system can mix and treat the contents of a tank faster than conventional systems can mix a tank.

Thus, application of the nozzle mixing system can reduce the worldwide spread of aquatic invasive species and the environmental and economic impact they can cause.

EXAMPLES

Examples will now be described in detail below that serve to illustrate embodiments of the nozzle mixing system and method described herein. However, it will be understood that the present invention is in no way limited to the examples set forth below.

Example 1

The nozzle mixing system was tested in a ballast tank having a double-bottom area. Ballast tanks having double-bottom areas are commonly found on many ships. The placement of the nozzles determines the necessary energy to establish circulating currents that result in pulling water out of the double-bottom area.

Figure 13B:
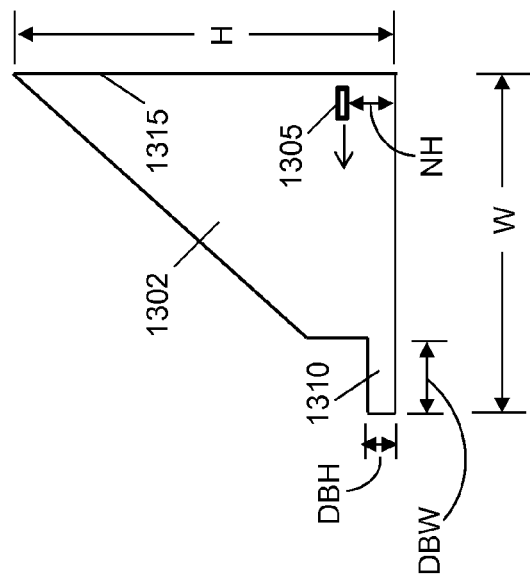
FIG. 13B is a schematic side view of the ballast tank of FIG. 13A.
Figure 13A:
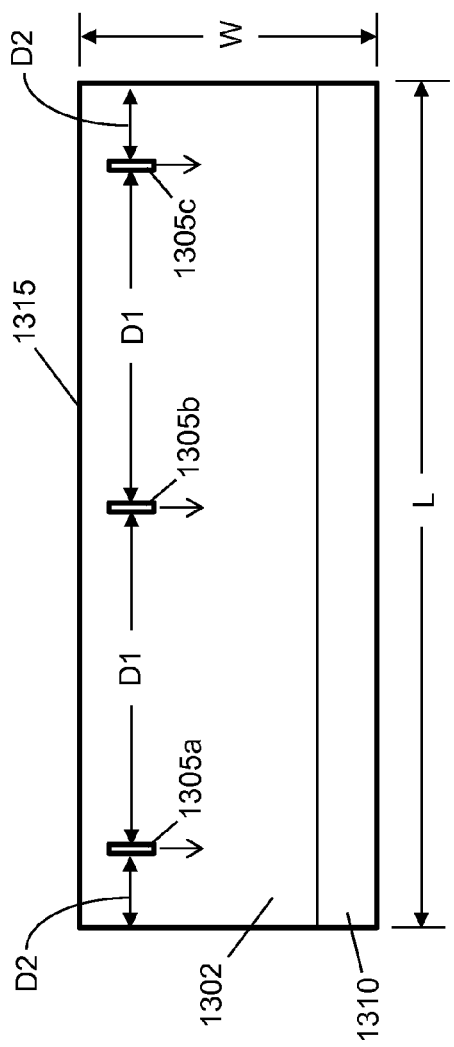
FIG. 13A is a schematic top view of a ballast tank illustrating placement of three nozzles according to an example of an embodiment of the invention.

Example 1 is illustrated in FIGS. 13A and 13B. FIG. 13A is a schematic top view of a ballast tank 1302 with three nozzles 1305a, 1305b, and 1305c and a double-bottom area 1310. FIG. 13B is a schematic side view of the ballast tank 1302. The nozzle mixing system and method was tested on the ship the Indiana Harbor (American Steamship Company, Williamsville, N.Y.) in ballast tank #4 on the starboard side. The ballast tank had a length L of 144 feet, a width W of 39 feet, and a height H of 45 feet. The double-bottom area 1310 had a height DBH of 31 inches and a width DBW of 9 feet, 9 inches. The tank had 17 web frames that were each 4 feet high and spaced every 8 feet. The depth of water in the tank was 20 feet.

The nozzles were mounted at a height NH of 88 inches from the bottom of the tank 1302 on the inside of seaward wall 1315 with the nozzles pointing towards mid-ship. To determine the position of the three nozzles 1305a, 1305b, and 1305c laterally, the overall length of the tank was divided by three and each of the nozzles was respectively placed at approximately the center of each one-third portion of the length of the tank 1302. In Example 1, the nozzle 1305b was placed at the middle of the length L of the tank, nozzles 1305a and 1305b were placed at a distance D1 of 47 feet, respectively, on either side of the nozzle 1305b, leaving a distance D2 of 25 feet at the forward and aft ends of the tank. The height and lateral positions of the nozzles were sufficient to establish the desired mixing and circulation currents in the tank.

Each nozzle had a ¾-inch diameter nozzle orifice. A 3-inch diameter hose supplied water to each nozzle at a rate of 110 gallons per minute (GPM) at 50 pounds per square inch (PSI) at the nozzle outlet, and 330 GPM total.

Tank mixing was completed in less than 1.5 hours.

Example 2

Figure 14B:
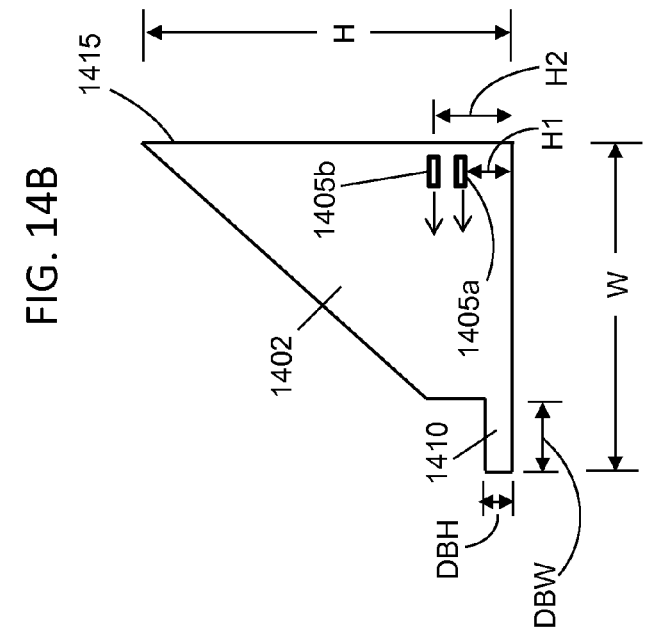
FIG. 14B is a schematic side view of the ballast tank of FIG. 14A.
Figure 14A:
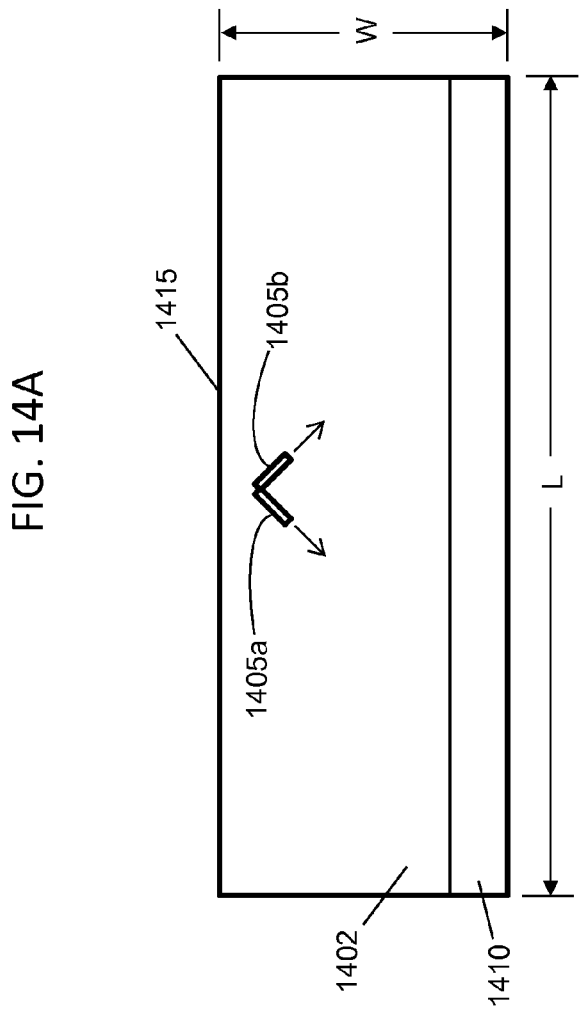
FIG. 14A is a schematic top view of a ballast tank illustrating placement of two nozzles according to an example of an embodiment of the invention.
Figure 14D:
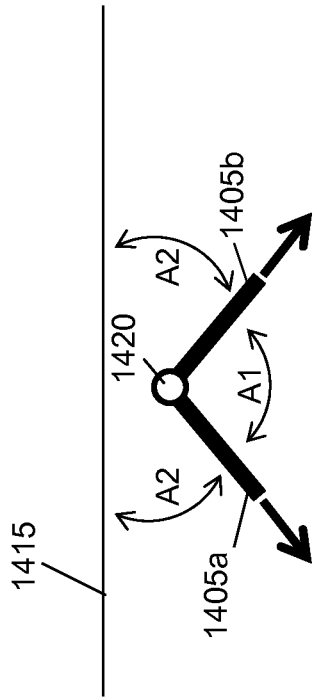
FIG. 14D is a schematic plan view of the nozzle arrangement shown in FIG. 14C.
Figure 14C:
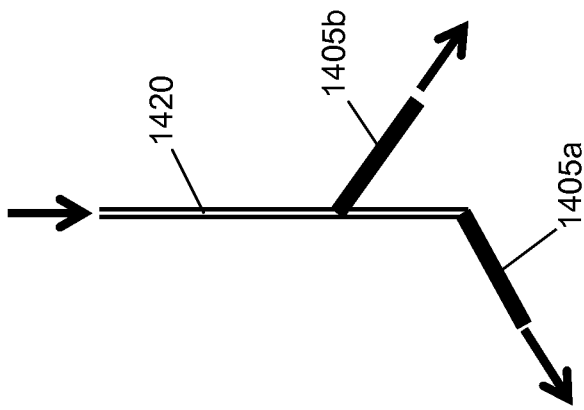
FIG. 14C is a schematic perspective view of the nozzle arrangement shown in FIG. 14A.

The Indiana Harbor was also used for the second example, with the same ballast tank dimensions as in Example 1. Example 2 is illustrated in FIGS. 14A to 14D. FIG. 14A is a schematic top view of a ballast tank 1402 with two nozzles 1405a and 1405b and a double-bottom area 1410. FIG. 14B is a schematic side view of the ballast tank 1402 of FIG. 14A. FIG. 14C is a schematic perspective view of arrangement of the nozzles 1405a and 1405b. FIG. 14D is a schematic plan view of the nozzle arrangement shown in FIG. 14C.

As shown in FIG. 14A, the nozzles 1405a and 1405b are located laterally in the center of the tank 1402 along a seaward wall 1415. The height of each of the nozzles 1405a and 1405b from the bottom of the tank 1402 differs, as shown in FIGS. 14B and 14C. A pipe/hose 1420 conveys water to the nozzles 1405a and 1405b. The nozzle 1405a at the end of the pipe/hose 1420 is located at a height H1 of 97 inches from the bottom of the tank. Pipe fittings (not shown) that connected the bottom nozzle 1405a to the top nozzle 1405b resulted in the top nozzle 1405a being 13 inches above the bottom nozzle 1405b, placing the top nozzle 1405b at a height H2 of 110 inches from the bottom of the tank 1402.

The orientation of the nozzles 1405a and 1405b relative to each other and the seaward wall 1415 of the tank 1402 is shown in FIG. 14D. The nozzles 1405a and 1405b were oriented at an angle A1 of 90° from one another and at an angle A2 of 45° from the seaward wall 1415 of the tank 1402. Each nozzle had a ⅞-inch diameter nozzle orifice. A 4-inch diameter hose supplied water to each nozzle at a rate of 150 GPM at 50 PSI at the nozzle outlet, and 300 GPM total.

Tank mixing was completed in less than 2 hours.

The type, location, and pressure and volume of the water delivered to the nozzles during the tests are applicable for many ballast tank configurations. However, smaller tanks that are not geometrically complex will require fewer nozzles and lower volume and pressure of water delivered to the nozzles. Likewise, larger tanks that are geometrically complex may require more nozzles and may also require higher volume and pressure delivered to the nozzles.

Thus, it will be appreciated by those skilled in the art that modifications and variations of the present invention are possible without departing from the principles and spirit of the invention, the scope of which is defined in the appended claims and their equivalents.

REFERENCES CITED

Bureau of Transportation Statistics 2007 (2008) Washington, D.C. United States Department of Transportation, Research and Innovative Technology Administration http://www.bts.gov/publications/maritime trade and transportation/2007/pdf/entire.pdf.

Carlton, J. T., Reid, D. M. and Leeuwen, H. van. 1994. The role of shipping in the introduction of nonindigenous aquatic organisms to the coastal waters of the United States (other than the Great Lakes) and an analysis of control options. The National Biological Invasions Shipping Study (NABISS). U.S. Coast Guard and National Sea Grant Program.

Carlton, J. T. 1985. Transoceanic and interoceanic dispersal of coastal marine organisms: the biology of ballast water. Oceanogr. Mar. Biol. Ann. Rev. 23: 313-371.

Carlton, J. T. and Geller, J. B. 1993. Ecological roulette: the global transport of nonindigenous marine organisms. Science 261: 78-82.

Chesapeake Bay Commission. 1995. The introduction of nonindigenous species to the Chesapeake Bay via ballast water. Chesapeake Bay Commission, Annapolis, Md. 28p.

Chu, K. H., Tam, P. F., Fung, C. H., and Chen, Q. C. 1997. A biological study of ballast water in container ships entering Hong Kong. Hydrobiologia 352: 201-206.

Elton, C. S. 1958. The ecology of invasions of animals and plants. Methuen and Company, Ltd., London. 181 pp.

Mooney, H. A. and Drake, J. A. (eds). 1986. Ecology of biological invasions of North America and Hawaii. Springer-Verlag, New York National Academies of Science (NAS) 1996. Stemming the tide: controlling introductions of nonindigenous species by ships' ballast water. Marine Board Committee on Ships' Ballast Operations. National Academies Press, Wash. D.C., 160p. ISBN: 0-309-58932-0

Office of Technology Assessment Archive, 1993. Harmful Non-Indigenous Species in the United States, September 1993, OTA-F-565, NTIS order #PB94-107679, GPO stock #052-003-01347-9

What is claimed is:

1. A system for treating ship or barge ballast water, comprising:
   a ballast tank storing ballast water;
   a flow sensor used to determine circulation flow or velocity of the ballast water;
   one or more nozzles located in the ballast tank;

and one or more pumps to supply a chemical into the ballast tank and to supply water to the nozzles, the nozzles located in the ballast tank to generate a circulation current that mixes all areas of the tank without removing the ballast water from the ballast tank and conveying it to a separate mixing and treatment area located outside the ballast tank;

a controller to receive a signal from the flow sensor to control the one or more pumps to enable operating the nozzles alternately and intermittently to circulate the ballast water and the mix the chemical with the ballast water;

whereby the treatment system results in minimized energy consumption.

2. The system of claim 1, wherein the ballast tank comprises multiple sections separated by structural web frames with lightening holes, and wherein a number of and locations of nozzles used is adapted to the geometry and size of the ballast tank and the shape and number of the web frames.

3. The system of claim 1, wherein the nozzles deliver jets of pressurized water to the ballast water to create mixing circulation currents inside the ballast tank.

4. The system of claim 3, wherein the circulation currents move the ballast water from one section of the ballast tank to adjacent sections through lightening holes in transverse web frames between the ballast tank sections and pull water out of areas in the ballast tank that are nearly hydraulically isolated by support structures within the ballast tank.

5. The system of claim 1, wherein the top of the ballast tank has access ports and the nozzles are deployed in the ballast tank without modifying the ship or barge by lowering the nozzles into the ballast tank through the access ports.

6. The system of claim 1, wherein the water pumped through the nozzles is supplied to the nozzles from a firefighting water supply system on the ship or barge.

7. The system of claim 1, wherein the nozzles are located within the ballast tank to generate transverse flow and rotary circulation currents, and to exploit the geometry of the ballast tank to overcome resistive forces related to drag over structures of the ballast tank.

8. The system of claim 1, wherein the nozzles are located within the ballast tank to generate mixing circulation cells that impart energy and flow into all areas of the ballast tank, that are stable and predictable, and that require relatively low levels of energy input.

9. The system of claim 1, wherein a lateral position of the nozzles within the ballast tank is determined by dividing the length of the ballast tank by the number of nozzles used and placing each of the nozzles respectively at the center of each divided portion of the ballast tank.

10. The system of claim 1, further comprising a pipe installed along a length of a double-bottom area of the ballast tank with a pipe nozzle located at an entrance of the pipe, the pipe nozzle directing water inside the pipe and the water exiting the pipe generating energy that moves the ballast water through tank sections via lightening holes in web frames between the tank sections to complete a circulation cell.

11. The system of claim 1, wherein at least one of the one or more pumps is located in an area of the ballast tank that is isolated by baffles and support structures inside the ballast tank and that is difficult to mix.

12. The system of claim 1, further comprising valves connected to the one or more pumps and to the controller, the controller regulating the one or more pumps and the valves to operate the nozzles alternately and intermittently by controlling switching frequencies and duration of water flow from the nozzles, the intermittent operation optimizing a mixing rate and minimizing energy consumption of the system while maintaining velocities sufficient for mixing.

13. The system of claim 12, further comprising the flow sensor being located in the ballast tank to signal turning the valves on and off to minimize energy required by the system.

14. A method for treating ship or barge ballast water in a ballast tank, comprising:

providing one or more nozzles in the ballast tank; and pumping water through the nozzles into the ballast water in the ballast tank and injecting a chemical into the water pumped through the nozzles, the nozzles strategically located in the ballast tank to circulate the ballast water and mix the chemical with the ballast water in the ballast tank without removing the ballast water from the ballast tank to a separate mixing and treatment area located outside the ballast tank;

wherein said pumping water through the nozzles comprises operating the nozzles alternately and intermittently as a function of determined circulating flow or velocity of the ballast water to optimize a mixing rate and minimize energy consumption while maintaining velocities sufficient for mixing.

15. The method of claim 14, wherein said providing one or more nozzles in the ballast tank comprises lowering the nozzles into the ballast tank through access ports located in the top of the ballast tank that are accessible from a deck of the ship or barge.

16. The method of claim 14, wherein said providing one or more nozzles in the ballast tank comprises determining a lateral position of the nozzles by dividing the length of the ballast tank by the number of nozzles used and placing each of the nozzles respectively at the center of each divided portion of the ballast tank.

17. The method of claim 14, wherein said pumping water through the nozzles into the ballast water in the ballast tank creates circulation currents that move the ballast water from one section of the ballast tank to adjacent sections through lightening holes in transverse web frames between the ballast tank sections, and pull water out of areas in the ballast tank that are nearly hydraulically isolated by support structures within the ballast tank.

18. The method of claim 14, wherein said operating the nozzles alternately and intermittently comprises controlling switching frequencies and duration of water flow from the nozzles.

19. The method of claim 14, further comprising installing a pipe along a length of a double-bottom area of the ballast tank and locating a pipe nozzle at an entrance of the pipe, the pipe nozzle directing water inside the pipe and the water exiting the pipe generating energy that moves the ballast water through tank sections via lightening holes in web frames between the ballast tank sections to complete a circulation cell.

20. The method of claim 14, wherein the circulating flow velocity of the ballast water is determined by a flow sensor located in the ballast tank.

* * * * *